United States Patent
Akarapu et al.

(10) Patent No.: US 11,999,074 B2
(45) Date of Patent: Jun. 4, 2024

(54) SYSTEMS AND METHODS FOR STIFFENING WET EXTRUDATE BY CIRCUMFERENTIAL IRRADIATION

(71) Applicant: CORNING INCORPORATED, Corning, NY (US)

(72) Inventors: Ravindra Kumar Akarapu, Horseheads, NY (US); Priyank Paras Jain, Horseheads, NY (US); Xinghua Li, Horseheads, NY (US); John Forrest Wight, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 29 days.

(21) Appl. No.: 17/634,771

(22) PCT Filed: Aug. 7, 2020

(86) PCT No.: PCT/US2020/045345
§ 371 (c)(1),
(2) Date: Feb. 11, 2022

(87) PCT Pub. No.: WO2021/030177
PCT Pub. Date: Feb. 18, 2021

(65) Prior Publication Data
US 2022/0332012 A1    Oct. 20, 2022

Related U.S. Application Data

(60) Provisional application No. 62/886,658, filed on Aug. 14, 2019.

(51) Int. Cl.
*B28B 11/24*    (2006.01)
*B28B 3/26*    (2006.01)

(52) U.S. Cl.
CPC ............ *B28B 11/243* (2013.01); *B28B 3/269* (2013.01)

(58) Field of Classification Search
CPC . B28B 11/243; B28B 3/269; B28B 2003/203; B29C 48/11; B29C 48/9105
See application file for complete search history.

(56) References Cited

U.S. PATENT DOCUMENTS

| 4,725,391 A | 2/1988 | Bardhan et al. |
| 5,223,188 A | 6/1993 | Brundage et al. |

(Continued)

FOREIGN PATENT DOCUMENTS

| CN | 1874878 A | 12/2006 |
| CN | 100420650 C | 9/2008 |

(Continued)

OTHER PUBLICATIONS

International Search Report and Written Opinion of the International Searching Authority; PCT/US2020/045345; dated Dec. 8, 2020; 14 pages; European Patent Office.

(Continued)

*Primary Examiner* — S. Behrooz Ghorishi
(74) *Attorney, Agent, or Firm* — Russell S. Magaziner

(57) ABSTRACT

An extrusion system (100) according to certain aspects includes at least one infrared emitting device (102) arranged in a generally cylindrical shape with a hollow interior. The at least one infrared emitting device (102) is positioned downstream of an outlet of an extrusion die (110) to irradiate a perimeter of wet extrudate material in a uniform manner to form stiffened wet extrudate material (116) before such material is received by an extrudate support channel (118). The at least one infrared emitting device (102) generally uniformly stiffens the skin of the wet extrudate material (116) to resist mechanical deformation of the extrudate (Continued)

material during subsequent handling steps. Such skin stiffening allows for increased tolerance of handling forces and permits extrusion of softer wet extrudate material without compromising the shape of a fired ceramic product.

20 Claims, 11 Drawing Sheets

(56) References Cited

U.S. PATENT DOCUMENTS

| | | | |
|---|---|---|---|
| 5,458,834 A | 10/1995 | Faber et al. | |
| 5,946,817 A | 9/1999 | Sato | |
| 7,560,154 B2 | 7/2009 | Katoh | |
| 9,789,633 B2 | 10/2017 | Akarapu et al. | |
| 9,833,927 B2 | 12/2017 | Chapman et al. | |
| 9,931,763 B2 | 4/2018 | Gordon, III et al. | |
| 2005/0093209 A1* | 5/2005 | Bergman | B29C 48/865 264/489 |
| 2007/0096352 A1* | 5/2007 | Cochran | H05B 3/0057 264/492 |
| 2008/0125509 A1 | 5/2008 | Fabian et al. | |
| 2008/0258348 A1 | 10/2008 | Feldman et al. | |
| 2009/0079111 A1 | 3/2009 | Kasai et al. | |
| 2009/0166355 A1 | 7/2009 | Brundage et al. | |
| 2010/0304041 A1 | 12/2010 | Fletcher et al. | |
| 2011/0006461 A1* | 1/2011 | Dasher | G01N 21/359 264/408 |
| 2011/0260370 A1 | 10/2011 | Lize | |
| 2012/0086153 A1 | 4/2012 | Kudo et al. | |
| 2014/0061963 A1* | 3/2014 | Gordon, III | B29C 48/91 264/145 |
| 2015/0210024 A1* | 7/2015 | Koide | B29C 31/008 264/150 |
| 2015/0352748 A1* | 12/2015 | Akarapu | B29C 35/04 264/489 |

FOREIGN PATENT DOCUMENTS

| | | |
|---|---|---|
| CN | 101541708 A | 9/2009 |
| CN | 102515775 A | 6/2012 |
| CN | 103204690 A | 7/2013 |
| CN | 104936754 A | 9/2015 |
| CN | 105121107 A | 12/2015 |
| CN | 107892581 A | 4/2018 |
| CN | 208558257 U | 3/2019 |
| DE | 3802146 C1 | 2/1989 |
| EP | 0325961 A2 | 8/1989 |
| EP | 2355966 A1 | 8/2011 |
| EP | 2079571 B1 | 12/2015 |
| JP | 2007-229709 A | 9/2007 |
| JP | 5854729 B2 | 2/2016 |
| WO | 2010/055206 A1 | 5/2010 |
| WO | 2015/192890 A1 | 12/2015 |

OTHER PUBLICATIONS

Chinese Patent Application No. 202080069783.2, Office Action dated Feb. 10, 2023, 5 pages (English Translation only), Chinese Patent Office.

* cited by examiner

SYSTEMS AND METHODS FOR STIFFENING WET EXTRUDATE BY CIRCUMFERENTIAL IRRADIATION

CROSS REFERENCE TO RELATED APPLICATION

This is a national stage application under 35 U.S.C. § 371 of International Application No. PCT/US2020/045345, filed on Aug. 7, 2020, which claims the benefit of priority under 35 U.S.C § 120 of U.S. Provisional Application Ser. No. 62/886,658 filed on Aug. 14, 2019, the content of which is relied upon and incorporated herein by reference in their entireties.

BACKGROUND

The disclosure relates to extrudate production, and more particularly to systems and methods for skin stiffening of wet extrudate by circumferential irradiation.

Ceramic extrudates are used in a wide variety of applications, such as substrates for automotive exhaust catalytic converters, particulate traps within diesel and gasoline engines, chemical filtration processes, and the like. Ceramic bodies produced by extrusion and having honeycomb cross-sectional shapes are frequently employed to provide a large filtration and/or catalytic surface area within a relatively small overall volume. The manufacturing process for extruded ceramic bodies typically includes producing wet extrudate of desired shape and dimensions using an extrusion apparatus, cutting the extrudate into sections, and transferring the cut sections to a kiln for firing to produce a dry fired body.

It is important to maintain the shape of the wet extrudate material upon leaving an extrusion die through production into a fired product. Further, larger products typically require further processing (e.g., contouring, applied skin processing, etc.) to mitigate quality issues resulting from slump of the wet extrudate material, which can significantly add to manufacturing costs.

Conventional methods that have been developed to attempt to strengthen wet extrudate material prior to firing have suffered from inadequate results, due to non-uniform stiffening or other complications. For example, radio frequency and microwave radiation are generally volumetric energy sources and deposit energy in modes that may produce hot and cold spots, thereby which may result in distortion of cells within wet extrudate material. Other methods such as heating by clamshell irradiation or impingement of hot air on an exterior of wet extrudate may suffer from lack of uniformity, and may also heat the skin of wet extrudate up to 65° C., which may lead to stiffness by thermogelation (instead of drying) such as due to the presence of an organic binder, and such stiffness increase may be temporary and subject to decrease when the extrudate is cooled.

SUMMARY

An extrusion system according to certain aspects includes at least one infrared emitting device arranged in a generally cylindrical shape with a hollow interior. The at least one infrared emitting device is positioned downstream of an outlet of an extrusion die to irradiate a perimeter of wet extrudate material in a uniform manner to form stiffened wet extrudate material before such material is received by an extrudate support channel. The at least one infrared emitting device generally uniformly stiffens the skin of the wet extrudate material to resist mechanical deformation of the extrudate material during subsequent handling steps. Such skin stiffening allows for increased tolerance of handling forces and permits extrusion of softer wet extrudate material without compromising the same of a fired ceramic product, among other advantages.

In one aspect, the present disclosure relates to an extrusion system including an extrusion die, at least one infrared emitting device, and an extrudate support channel. The extrusion die includes an outlet and is configured to continuously form wet extrudate material including a honeycomb cross-section. The at least one infrared emitting device has a hollow interior and is positioned downstream of the outlet in a direction of travel of the wet extrudate material, arranged in a generally cylindrical shape around a perimeter of the wet extrudate material, and is configured to uniformly irradiate the perimeter of the wet extrudate material to form stiffened wet extrudate material. The extrudate support channel is configured to receive the stiffened wet extrudate material following passage of the wet extrudate material through the hollow interior of the at least one infrared emitting device.

In certain embodiments, the at least one infrared emitting device is configured to produce infrared emissions having at least one peak emission wavelength and at least one full-width, half-maximum emission wavelength range. Further, the wet extrudate material includes a plurality of constituents each having an absorption spectrum having at least one peak absorption wavelength and at least one full-width, half-maximum absorption wavelength range. Further, the at least one full-width, half-maximum emission wavelength range includes at least one wavelength value within 1 micrometer of a wavelength of the at least one full-width, half-maximum absorption wavelength range of the absorption spectrum of at least one constituent of the plurality of constituents. In certain embodiments, the at least one peak emission wavelength includes at least one of 1.2 µm or 2.9 µm. In certain embodiments, the at least one peak absorption wavelength includes at least one of 3 µm, 6 µm, or 10 µm. In certain embodiments, the generally cylindrical shape of the at least one infrared emitting device includes an internal diameter of at least 100 mm. In certain embodiments, the at least one infrared emitting device includes at least one laser. In certain embodiments, the at least one infrared emitting device includes at least one lamp.

In certain embodiments, the at least one infrared emitting device includes a plurality of infrared emitting devices, and each infrared emitting device of the plurality of infrared emitting devices is configured to produce infrared emissions of a different peak emission wavelength and a different full-width, half-maximum emission wavelength range. In certain embodiments, the at least one infrared emitting device includes a plurality of infrared emitting devices including a first infrared emitting device and a second infrared emitting device positioned downstream of the first infrared emitting device in the direction of travel of the wet extrudate material. In certain embodiments, the first infrared emitting device and the second infrared emitting device are each arranged in a generally cylindrical shape, and the first and second infrared emitting devices are configured to irradiate the wet extrudate material with differing total radiant flux. In certain embodiments, the extrusion system is configured to irradiate the wet extrudate material with an intensity and duration selected to provide the stiffened wet extrudate material with a uniformly stiffened external surface and a non-stiffened core. In certain embodiments, the present disclosure relates to a stiffened wet extrudate material formed from the foregoing extrusion system. The stiffened wet extrudate material has a porous structure that includes a uniformly stiffened external surface and a non-stiffened core including a honeycomb cross-section.

In one aspect, the present disclosure relates to a method of forming a stiffened wet extrudate material. The method includes continuously forming wet extrudate material including a honeycomb cross-section from an outlet of an extrusion die. The method further includes uniformly irradiating a perimeter of the wet extrudate material with infrared emissions produced by at least one infrared emitting device having a generally cylindrical shape with a hollow interior and positioned downstream of the outlet to form stiffened wet extrudate material. The method further includes passing the stiffened wet extrudate material through the hollow interior of the at least one infrared emitting device onto an extrudate support channel.

In certain embodiments, the infrared emissions include at least one peak emission wavelength and at least one full-width, half-maximum emission wavelength range corresponding to the at least one peak emission wavelength. Further, the wet extrudate material includes a plurality of constituents each having an absorption spectrum having at least one peak absorption wavelength and at least one full-width, half-maximum absorption wavelength range corresponding to the at least one peak absorption wavelength. Further, the at least one full-width, half-maximum emission wavelength range corresponding to the at least one peak emission wavelength includes at least one wavelength value within 1 micrometer of a wavelength of the at least one full-width, half-maximum absorption wavelength range corresponding to the at least one peak absorption wavelength of the absorption spectrum of at least one constituent of the plurality of constituents. In certain embodiments, the at least one peak emission wavelength includes at least one of 1.2 µm or 2.9 µm. In certain embodiments, the at least one peak absorption wavelength includes at least one of 3 µm, 6 µm, or 10 µm. In certain embodiments, the generally cylindrical shape of the at least one infrared emitting device includes an internal diameter of at least 100 mm. In certain embodiments, the at least one infrared emitting device includes at least one laser. In certain embodiments, the at least one infrared emitting device includes at least one lamp.

In certain embodiments, the at least one infrared emitting device includes a plurality of infrared emitting devices, and each infrared emitting device of the plurality of infrared emitting devices is configured to produce infrared emissions of a different peak emission wavelength and a different full-width, half-maximum emission wavelength range. In certain embodiments, the at least one infrared emitting device includes a plurality of infrared emitting devices including a first infrared emitting device and a second infrared emitting device positioned downstream of the first infrared emitting device in a direction of travel of the wet extrudate material. Also, the method further includes irradiating the wet extrudate material with a first radiant flux using the first infrared emitting device and irradiating the wet extrudate material with a second radiant flux using the second infrared emitting device, and the second radiant flux differs from the first radiant flux. In certain embodiments, uniformly irradiating the perimeter of the wet extrudate material further includes uniformly irradiating with an intensity and duration selected to provide the stiffened wet extrudate material with a uniformly stiffened external surface and a non-stiffened core.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
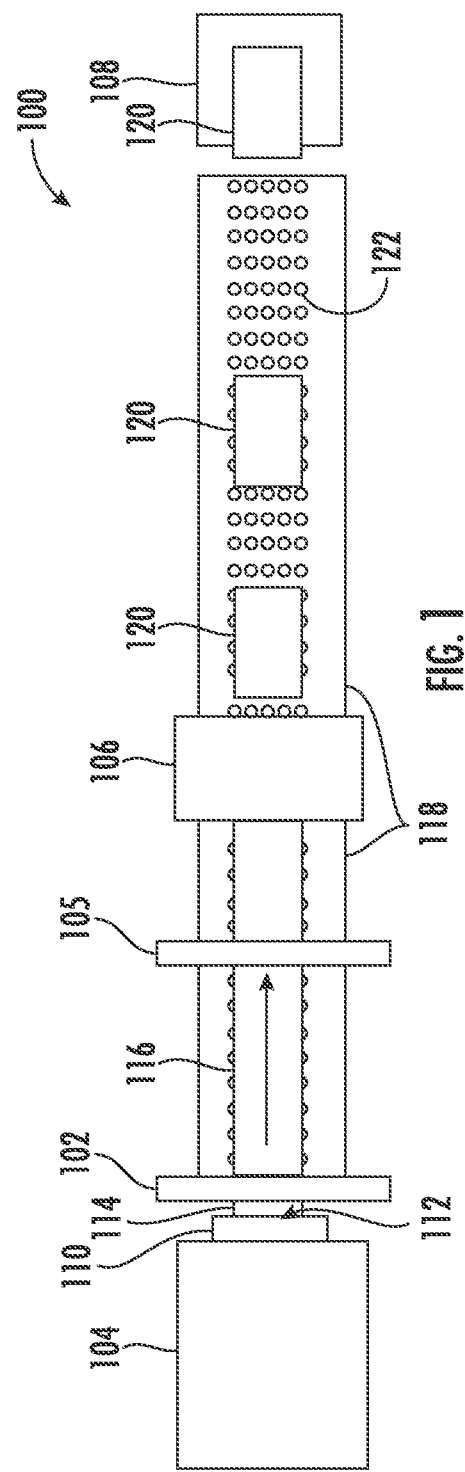
FIG. 1 is a schematic top plan view of an extrusion system including an infrared emitting device according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

We have found that when producing ceramic extrudates having large diameters, thin walls, and/or large open frontal areas, wet extrudate material can be subject to an increased likelihood of mechanical deformation during post-extrusion handling. Such mechanical deformation may lead to decreased quality in fired products and even significant production losses. For example, slump of wet extrudate material during manufacturing may compromise the shape of the fired product, which may be important to meet isostatic strength specifications. Maintaining the shape of the wet extrudate material upon leaving an extrusion die through production into a fired product is therefore important.

FIG. 1 is a schematic top plan view of an extrusion system 100 including at least one infrared emitting device 102 proximate to an outlet of an extrusion apparatus 104 (which may also be referred to herein as an extruder). The extrusion system 100 also includes at least one sensor 105, a cutting assembly 106 (which may also be referred to herein as a wet saw or wet saw assembly), and an extrudate support channel 118 arranged as part of a conveyor apparatus (e.g., including an air bearing surface enabling wet extrudate to be translated to a dryer tray 108 for subsequent transport to a kiln or other bulk drying apparatus) to produce a fired product (e.g., aluminum titanate, cordierite, other silica compositions, etc.).

The extrusion apparatus 104 has an extrusion die 110 including an outlet 112 and is configured to continuously form wet extrudate material 114. The infrared emitting device 102 is positioned downstream of the outlet 112 in a direction of travel of the wet extrudate material 114. The extrusion apparatus 104 is a horizontal extruder which horizontally extrudes the wet extrudate material 114. In certain embodiments, the wet extrudate material 114 is a wet ceramic material. In certain embodiments, the wet extrudate material 114 is a wet ceramic material, and may include constituents such as aluminum titanate, mullite, talc, alumina, silica, clays, aluminum hydroxide, or any other suitable ceramic precursor material. In certain embodiments, the wet extrudate material 114 includes graphite, which has a high absorption of infrared emissions and thereby requires less power to stiffen.

The infrared emitting device 102 is configured to impart energy around an entire perimeter (e.g., circumference) of the wet extrudate material 114 to dry and uniformly stiffen the external surface (i.e., exterior, or skin) to set the shape of the wet extrudate material 114 upon leaving the extrusion die 110 and form stiffened wet extrudate material 116. The extrusion system 100 irradiates the wet extrudate material 114 with an intensity and duration selected to form the stiffened wet extrudate material 116 with a uniformly stiffened external surface and a non-stiffened core. In certain embodiments, the stiffened wet extrudate material has a porous structure that includes a uniformly stiffened external surface and a non-stiffened core including a honeycomb cross-section.

An extrudate support channel 118 arranged as part of a conveyor apparatus is configured to receive the stiffened wet extrudate material 116 following passage of the wet extrudate material 114 through the infrared emitting device 102. In certain embodiments, the extrudate support channel 118 may have a partial circular, ovular, or rectangular cross-section to guide the stiffened wet extrudate material 116. The at least one sensor 105 is positioned between the infrared emitting device 102 and the wet saw assembly 106 to measure the moisture content of the stiffened wet extrudate material 116. In other embodiments, the at least one sensor 105 may include at least one positioned between the outlet 112 of the extrusion die 110 and the infrared emitting device 102 to measure a characteristic (e.g., moisture content) of the wet extrudate material 114. In other words, the at least one sensor 105 may be positioned upstream and/or downstream of the at least one infrared emitting device 102 in a direction of travel of the wet extrudate material 114 and/or the stiffened wet extrudate material 116. As the infrared emitting device 102 dries a circumferential portion of the wet extrudate material 114, the at least one sensor 105 provides feedback (e.g., real-time feedback) as to whether the wet extrudate material 114 and/or the stiffened wet extrudate material 116 is within acceptable specifications, particularly as to moisture content (e.g., to prevent overdrying), and especially for sensitive applications with narrow product specifications. In certain embodiments, a controller may be in electronic communication with the at least one sensor 105 and configured to adjust operating parameters of the infrared emitting device 102 (e.g., irradiation intensity), the extrusion apparatus 104 (e.g., the feed rate of the wet extrudate material 114), and/or an optional humidifier apparatus (not shown) to at least partially rehydrate the wet extrudate material 114 and/or the stiffened wet extrudate material 116, etc.

In certain embodiments, the at least one sensor 105 includes an optical sensor configured to sense a reflectance property (e.g., reflectance of electromagnetic radiation), an absorbance property (e.g., absorbance of electromagnetic radiation), and/or a temperature of the exterior surface of the wet extrudate material 114 and/or stiffened wet extrudate material 116. In certain embodiments, the at least one sensor 105 includes at least one radio frequency sensor configured to quantify moisture content in one or more portions of the wet extrudate material 114 and/or stiffened wet extrudate material 116.

The cutting assembly 106 cuts a portion from the stiffened wet extrudate material 116 to form a stiffened wet extrudate section 120 (which may also be referred to herein as a stiffened wet extrudate). In other words, the wet extrudate material 114 is extruded through the infrared emitting device 102 to form stiffened wet extrudate material 116, which is then translated by the extrudate support channel 118 to the wet saw assembly 106, which cuts the stiffened wet extrudate material 116 to form multiple stiffened wet extrudate sections 120.

Once cut, a stiffened wet extrudate section 120 is translated by the extrudate support channel 118 (as part of a conveyor apparatus) to the dryer tray 108. The extrudate support channel 118 may include an air bearing surface 122 over which the stiffened wet extrudate section 120 translates to promote low-friction movement of the stiffened wet extrudate section 120.

Figure 2A:
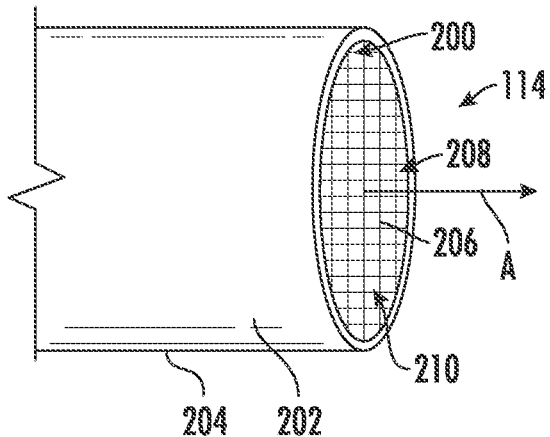
FIG. 2A is a perspective view of a wet extrudate material formed from the extrusion system of FIG. 1.
Figure 2B:
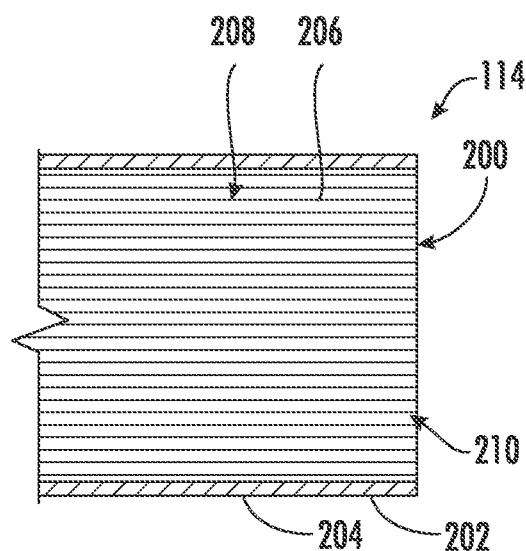
FIG. 2B is a side cross-sectional view of the wet extrudate material of FIG. 2A.
Figure 2C:
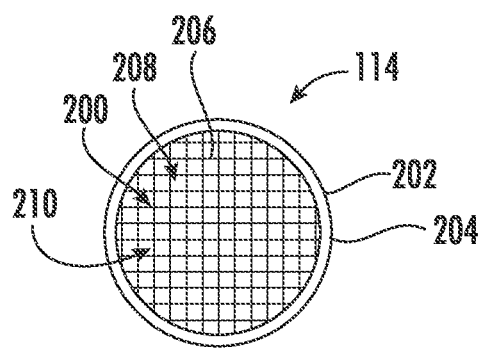
FIG. 2C is an end elevational view of the wet extrudate material of FIG. 2A.

FIGS. 2A-2C depict wet extrudate material 114 formed from the extrusion system of FIG. 1. It is to be noted that the stiffened wet extrudate material 116 and the stiffened wet extrudate sections 120 have similar configurations and features. The wet extrudate material 114 has a first end 200 (e.g., front end), as well as a peripheral wall 202 having an external surface 204 (i.e., skin or outer surface, etc.) and a plurality of intersecting walls 206 within the peripheral wall 202. The intersecting walls 206 form mutually adjoining cell channels 208 extending axially in direction "A" from the first end 200. In certain embodiments, the wet extrudate material 114 has a honeycomb cross-section 210. The wet extrudate material 114 may have a diameter of any size, including comparatively large sizes (e.g., diameters of 4 inches (101.6 mm), 6 inches (152.8 mm), or greater).

Figure 3A:
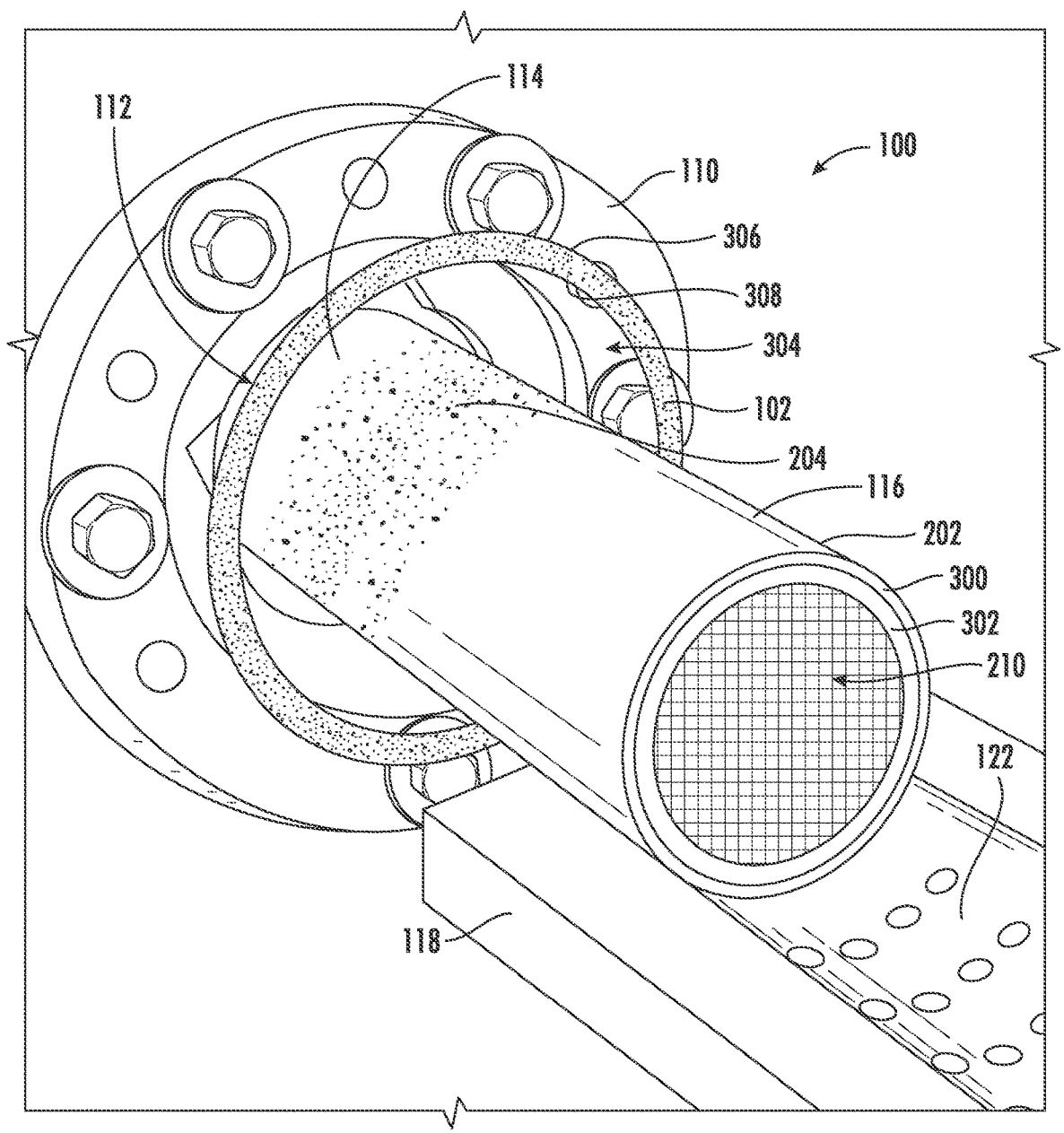
FIG. 3A is a perspective view of the infrared emitting device of FIG. 1 irradiating a wet extrudate material formed from an extrusion die of the extrusion system.
Figure 3B:
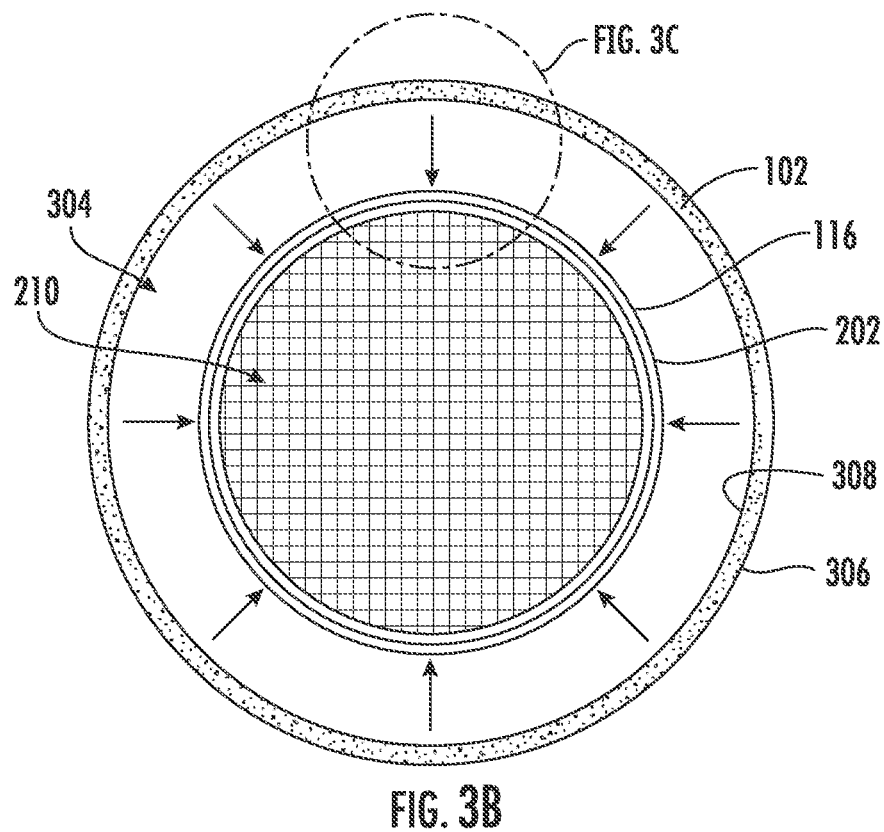
FIG. 3B is a front elevational view of the infrared emitting device and wet extrudate material of FIG. 3A.
Figure 3C:
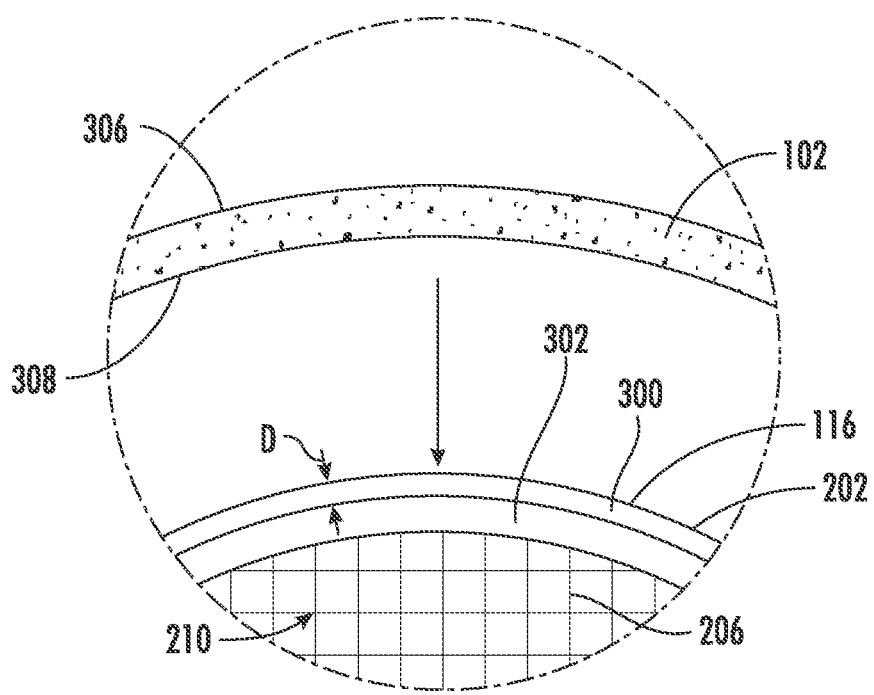
FIG. 3C is a magnified portion of FIG. 3B.

FIGS. 3A-3C are views of the infrared emitting device 102 of FIG. 1 irradiating the wet extrudate material 114 formed from the extrusion die 110 of the extrusion system 100. For example, in certain embodiments, the wet extrudate material 114 is extruded at a rate of 0.2 in/s (5 mm/s). The infrared emitting device 102 is configured to uniformly irradiate the external surface 204 (e.g., around the entire circumferential perimeter) of the wet extrudate material 114 to form stiffened wet extrudate material 116. In certain embodiments, the infrared emitting device 102 can be retrofitted to existing systems and/or integrated into new systems, without the cost and complexity of other alternative systems (e.g., systems for delivering a ring of hot air to wet extrudate material). Further, the infrared emitting device 102 is relatively small and does not significantly add to the space required in the manufacturing of the stiffened wet extrudate sections 120, which is advantageous in applications with limited space. The amount of energy emitted by the infrared emitting device 102 can be well controlled (e.g., patterned), unlike some other technologies (e.g., ring of hot air). However, it is noted that in certain embodiments, the infrared emitting device 102 can be used in combination with drying using a ring of hot air, such as for flash drying. In certain embodiments, the at least one infrared emitting device 102 includes an infrared lamp, one or more infrared lasers, infrared light emitting diodes, or other emitter types. In certain embodiments other electromagnetic emitters may be used (e.g., a microwave emitting device).

Referring to FIG. 3C, the peripheral wall 202 of the stiffened wet extrudate material 116 includes a stiffened outer portion 300 and a non-stiffened inner portion 302. The depth of penetration D of the emissions of the infrared emitting device 102 into the peripheral wall 202 (and the intersecting walls 206) may depend on the properties of the infrared emissions (e.g., intensity, duration, etc.) and/or the properties of the wet extrudate material 114.

Referring to FIG. 3A, the extrudate support channel 118 is configured to receive the stiffened wet extrudate material 116 following passage of the wet extrudate material 114 through the infrared emitting device 102. As the stiffened wet extrudate material 116 settles onto the air bearing surface 122 of the extrudate support channel 118, the stiffened wet extrudate material 116 retains the original shape of the wet extrudate material 114 as it exits the extrusion die 110.

Referring to FIGS. 3A-3B, the infrared emitting device 102 has a hollow interior 304 and is arranged in a generally cylindrical shape around a perimeter of the wet extrudate material 114, such that the wet extrudate material 114 passes through the hollow interior 304 of the at least one infrared emitting device 102. The infrared emitting device 102 includes a peripheral portion 306 and an inner surface 308 concentric with the peripheral portion 306. In certain embodiments, the generally cylindrical shape of the at least one infrared emitting device 102 includes an internal diameter of at least 100 mm (e.g., 164 mm). In certain embodiments, a central axis of the infrared emitting device 102 is aligned with a central axis of the outlet 112 of the extrusion die 110. In other words, the infrared emitting device 102 and the outlet 112 may share a common longitudinal axis.

The length (e.g., front to back) of the infrared emitting device 102 may be adjusted or selected depending on the desired duration of irradiation of the wet extrudate material 114 by the infrared emitting device 102. It is noted that an irradiation duration is also determined by the feed rate of the wet extrudate material 114 through the outlet 112 of the extrusion die 110.

Referring to FIG. 3C, in certain embodiments, the peripheral portion 306 includes a reflective coating to direct emissions inward toward the hollow interior 304 (and thereby the wet extrudate material 114). As the infrared emitting device 102 is generally cylindrical, the wet extrudate material 114 is also generally cylindrical, and the infrared emitting device 102 and the wet extrudate material 114 are aligned along a common axis. The infrared emitting device 102 provides generally uniform emissions toward a center of the hollow interior 304, which generally uniformly heats the wet extrudate material 114 in a circumferential band around the peripheral wall 202 of the wet extrudate material 114.

Use of the infrared emitting device 102 is very precise, and is devoid of contact with the wet extrudate material 114, only heating the surface of the wet extrudate material 114. Accordingly, the infrared emitting device 102 avoids distorting cells or mechanically deforming the wet extrudate material 114.

The stiffened periphery of the stiffened wet extrudate material 116 allows for increased tolerance of handling forces (e.g., contact with tray, gravity, acceleration forces, deceleration forces, etc.) with improved quality (i.e., without affecting the overall shape or internal configuration of the product), for example, as the stiffened wet extrudate section 120 translates from the air bearing surface 122 of the extrudate support channel 118 to the dryer tray 108. Further, by stiffening the peripheral wall 202, the wet extrudate material 114 can include greater water content and be extruded softer, thereby increasing longevity of life of extrusion die 110 and improving feed-rate of wet extrudate material 114. By stiffening the peripheral wall 202 and maintaining shape of the wet extrudate material 114, isostatic performance can also be improved (e.g., increased probability of reduced scatter in isostatic strength), even for products with thinner walls and larger open frontal areas. Stiffening the wet extrudate material 114 enables extrusion of larger size parts (e.g., greater than 7.5 inches (190.5 mm)) using the horizontal extrusion process, while also eliminating the need for further processing steps (e.g., contouring, applied skin processes, etc.). This can significantly reduce manufacturing costs.

In certain embodiments, local humidity is controlled such that thermal gelation and drying can be separated. For example, a substrate can be dried at room temperature with low humidity or thermally gelled without drying in high humidity.

Figure 4A:
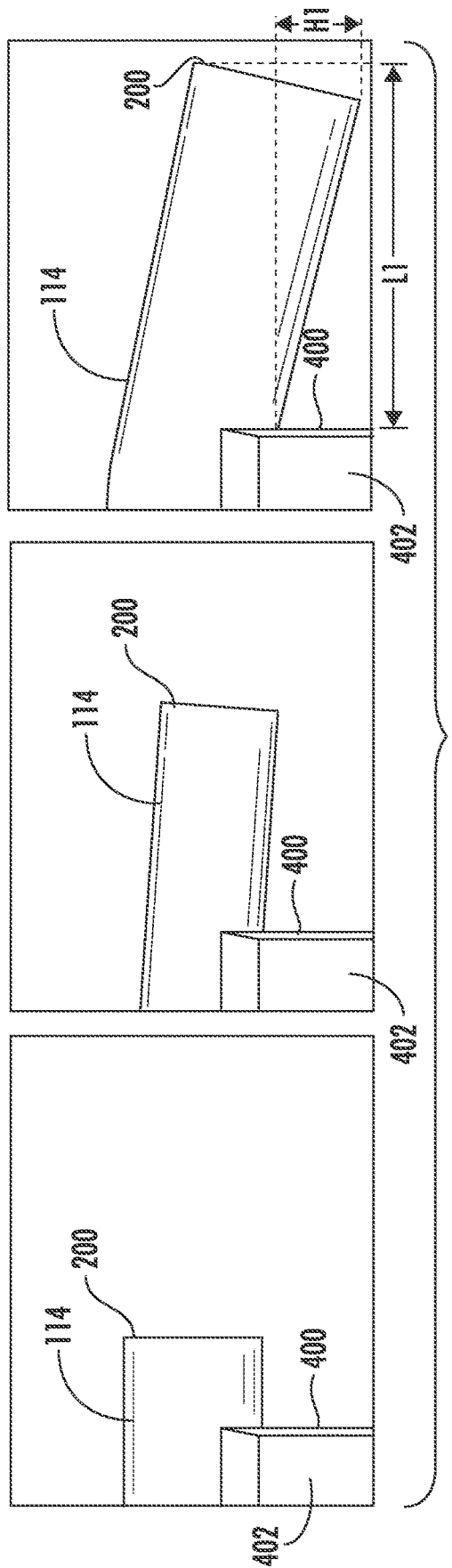
FIG. 4A is a series of side elevational view illustrations depicting movement of an unstiffened wet extrudate material following delivery from an extrusion die without being processed (i.e., stiffened) by the infrared emitting device of FIG. 1.
Figure 4B:
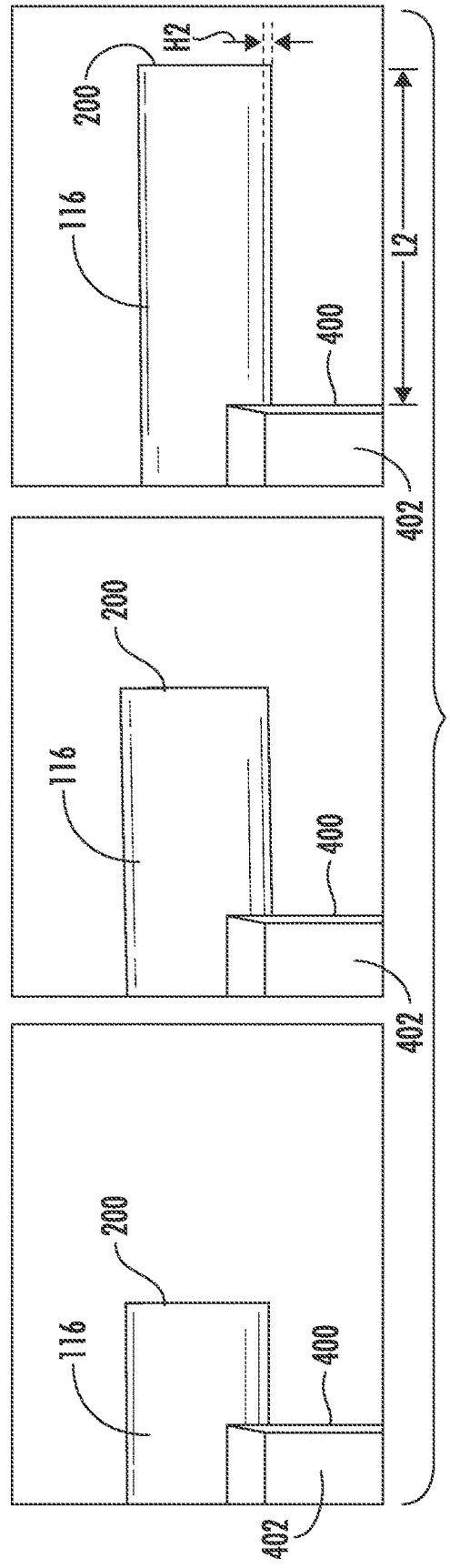
FIG. 4B is a series of side elevation view illustrations depicting movement of a stiffened wet extrudate material following delivery from an extrusion die and processing (i.e., stiffening) by the infrared emitting device of FIG. 1.

FIGS. 4A-4B are views comparing deformation results of cantilever tests performed on an unstiffened wet extrudate material 114 and a stiffened wet extrudate material 116. Referring to FIG. 4A, as the unstiffened wet extrudate material 114 travels past an end 400 of a tray 402 and overhangs, the unstiffened wet extrudate material 114 exhibits an increasing degree of droop where the first end 200 of the wet extrudate material 114 is vertically displaced downwardly due to gravity. In this example, the unstiffened wet extrudate material 114 resulted in a droop H1 of about six inches (152 mm) for an overhang L1 of about 8 inches (203 mm). Referring to FIG. 4B, as the stiffened wet extrudate material 116 travels past the end 400 of the tray 402 and overhangs, the stiffened wet extrudate material 116 exhibits a significantly lower degree of droop H2 than the unstiffened wet extrudate material 114 of FIG. 4A. In this example, the unstiffened wet extrudate material 114 was delivered at a rate of 0.2 in/s (5 mm/s) and treated with 1.38 KW of infrared energy centered at 1.4 microns wavelength. The stiffened wet extrudate material 116 had a droop H2 of less than 0.5 inches (12.7 mm) for an overhang L2 of about 8 inches (203 mm).

Figure 5A:
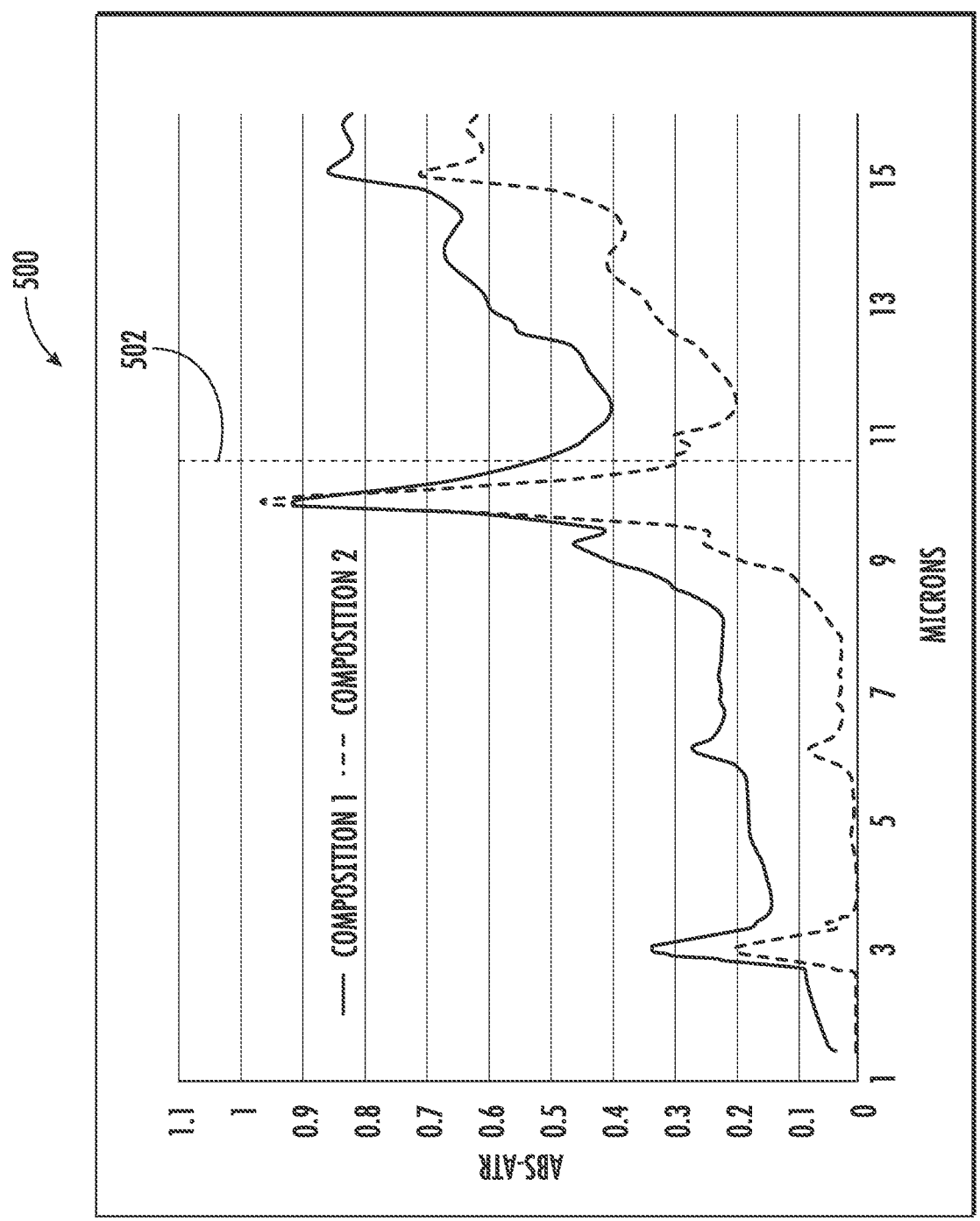
FIG. 5A is a chart illustrating infrared absorption bands of constituents of a ceramic-based wet extrudate batch material suitable for forming extruded products using the extrusion system of FIG. 1.

FIG. 5A is a chart 500 illustrating infrared absorption bands of wet extrudate materials 114 formed from the extrusion system 100 of FIG. 1. The infrared emitting device 102 can be configured so that emission properties of the infrared emitting device 102 better match absorption of the wet extrudate material 114, thereby ensuring effective coupling and lower power utilization. The chart 500 illustrates absorption bands in the infrared range for Composition 1 (including precursor material for ceramic substrate and filter products, with graphite) wet extrudate materials and Composition 2 (including precursor material for ceramic substrate and filter products without graphite). Similar absorption bands are present for both materials at 3 µm, 6 µm, 10 µm, and 15 µm regions. The band near 3 µm is due to OH bonds in the wet extrudate material 114. The band near 6 µm is due to $H_2O$ in the wet extrudate material 114. The band near 10 µm is due to inorganic oxides in the wet extrudate material 114. The delivered energy increases the temperature on the skin of the wet extrudate material 114 leading to gelation of polymers (e.g., Methocel™), vaporization of water, and drying of skin, leading to increase in modulus and strength. As illustrated, there is wavelength sensitivity to energy coupling. Coupling with the band near 3 µm may be better suited to control depth penetration (e.g., compared to coupling with the band near 10 µm), because the peak is smaller and does not absorb as well, so that radiation impinged on wet ceramic material may penetrate more deeply.

The infrared emitting device 102 may be configured to generate a peak emission wavelength based on a peak absorption wavelength, corresponding to infrared absorption of the wet extrudate material 114. The peak absorption wavelength of a particular wet extrudate material 114 may be determined by optical property measurements of the wet extrudate material 114. In certain embodiments, the at least one infrared emitting device 102 is configured to produce infrared emissions having at least one peak emission wavelength (e.g., 1.2 µm, 2.9 µm, etc.) and at least one full-width, half-maximum emission wavelength range. The wet extrudate material 114 includes a plurality of constituents each having an absorption spectrum having at least one peak absorption wavelength (e.g., 3 µm, 6 µm, 10 µm, etc.) and at least one full-width, half-maximum absorption wavelength range. The at least one full-width, half-maximum emission wavelength range includes at least one wavelength value within 1 micrometer of a wavelength of the at least one full-width, half-maximum absorption wavelength range of the absorption spectrum of at least one constituent of the plurality of constituents.

For reference, and as an example, line 502 around 10.6 µm corresponds to a $CO_2$ laser. As an example, a 50 W $CO_2$ laser beam rastered across a 12 mm line could be used to stiffen a 12 mm wide strip on the surface of a rectangular 20 mm thick, wet sheet of EX27 material fed at a speed of 2 in/s (5 mm/s). Since $CO_2$ laser energy is absorbed by inorganic oxides, energy will be absorbed even after the wet extrudate material is dried. In certain embodiments, higher power levels may lead to heating of dried material and burning the binder. Similarly, as another example, a 976 nm diode laser with 100 W of power concentrated to a 5 mm spot could stiffen a 5 mm wide strip fed at 1 in/s (2.5 mm/s) to a similar degree achievable with $CO_2$ laser treatment, but would be significantly less effective due to less efficient wavelength absorption.

In certain embodiments, $CO_2$ laser delivery may benefit from using space optics (e.g., mirrors), which may be challenging to design for uniform delivery. In certain embodiments, NIR (near infrared) lasers (e.g., diode lasers at 976 nm) could be delivered by optical fibers, but may be less effective in coupling. In one embodiment, these optical fibers could be attached to a circular ring and designed to supply energy in a near-uniform fashion on the outside surface of the wet extrudate material to achieve a zero (or near-zero) circumferential intensity gradient in intensity and high axial intensity gradient. While narrow-wavelength-band sources (e.g., lasers) can be used, broadband wavelength sources (e.g., infrared lamps) may be preferred for stiffening, since there is no requirement for coherent light sources, which can be expensive. As lasers are generally more expensive, more difficult to design for uniform delivery, and the narrow band provided by lasers is not necessary, infrared lamps with a wider band may be preferred in certain embodiments.

Figure 5B:
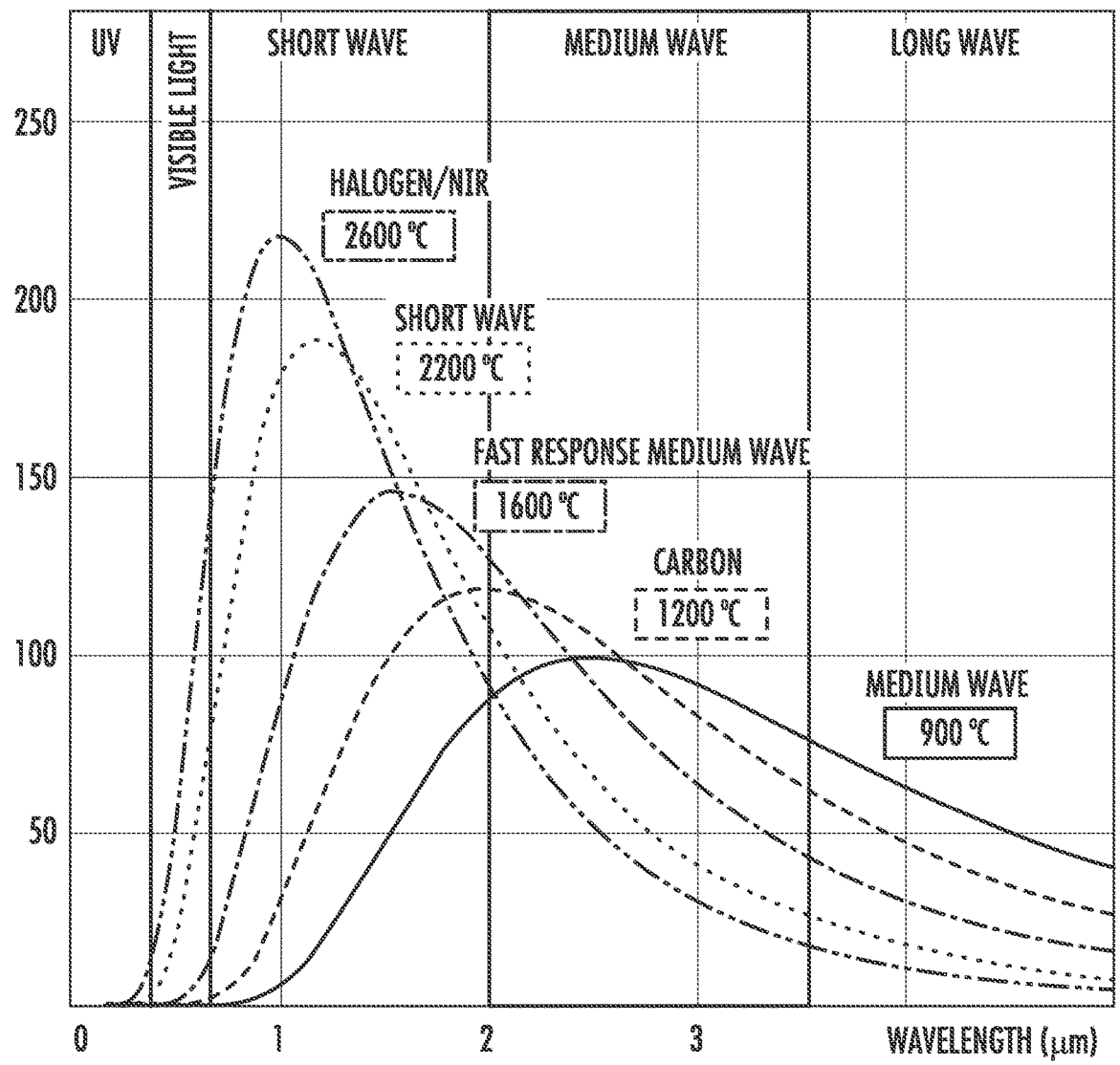
FIG. 5B is a chart illustrating power distribution as a function of wavelength for different types of blackbody-type emitting devices that could be used in the extrusion system of FIG. 1.

FIG. 5B is a chart 504 illustrating power distribution as a function of wavelength for different types of blackbody emitting devices (e.g., infrared emitting devices 102) for use in the extrusion system 100 of FIG. 1. Different types of infrared emitting devices 102 may be chosen depending on the application. The different types of infrared emitting devices 102 include halogen, NIR (near infrared), short wave, fast response medium wave, carbon, and/or medium wave. In certain embodiments, the infrared emitting device is chosen based on absorption of energy delivered by the infrared emitting device 102 and the ease of configuration to deliver the energy in the least amount of space. For example, in certain embodiments, a medium wave infrared emitting device may be chosen because the maximum energy is centered at around 2.9 μm, which coincides with OH bond peak of the wet extrudate material 114 for better coupling. Accordingly, the medium wave infrared emitting device may provide better performance than the short wave infrared emitting device.

Figure 6:
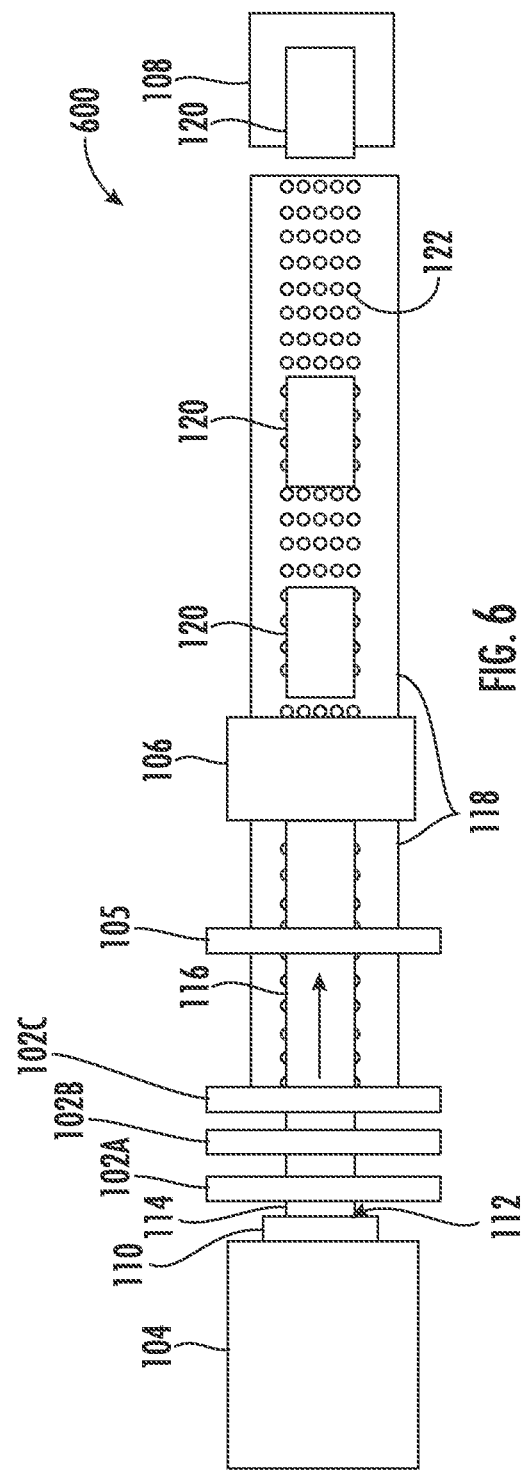
FIG. 6 is a top view of an extrusion system including multiple infrared emitting devices arranged in series.

FIG. 6 is a top view of an extrusion system 600 including a plurality of infrared emitting devices 102A-102C. FIG. 6 includes elements with common reference numbers as elements in FIG. 1, and thus will not be re-described. In certain embodiments, each infrared emitting device 102A-102C of the plurality of infrared emitting devices 102A-102C is configured to produce infrared emissions of a different peak emission wavelength and a different full-width, half-maximum emission wavelength range. In certain embodiments, the plurality of infrared emitting devices 102A-102C includes a second infrared emitting device 102B positioned downstream of a first infrared emitting device 102A in the direction of travel of the wet extrudate material 114, as well as a third infrared emitting device 102C positioned downstream of the first infrared emitting device 102A and the second infrared emitting device 102B in a direction of travel of the wet extrudate material 114. In certain embodiments, each of the plurality of infrared emitting devices 102A-102C are each arranged in a generally cylindrical shape, and configured to irradiate the wet extrudate material 114 with differing total radiant flux. In certain embodiments, use of multiple infrared emitting devices 102A-102C may result in better performance and/or more manufacturing options. For example, multiple infrared emitting devices 102A-102C may allow for better depth penetration control, increased energy efficient coupling, and/or softer extrusion, etc. Of course, any number of infrared emitting devices 102A-102C could be used.

Figure 7:
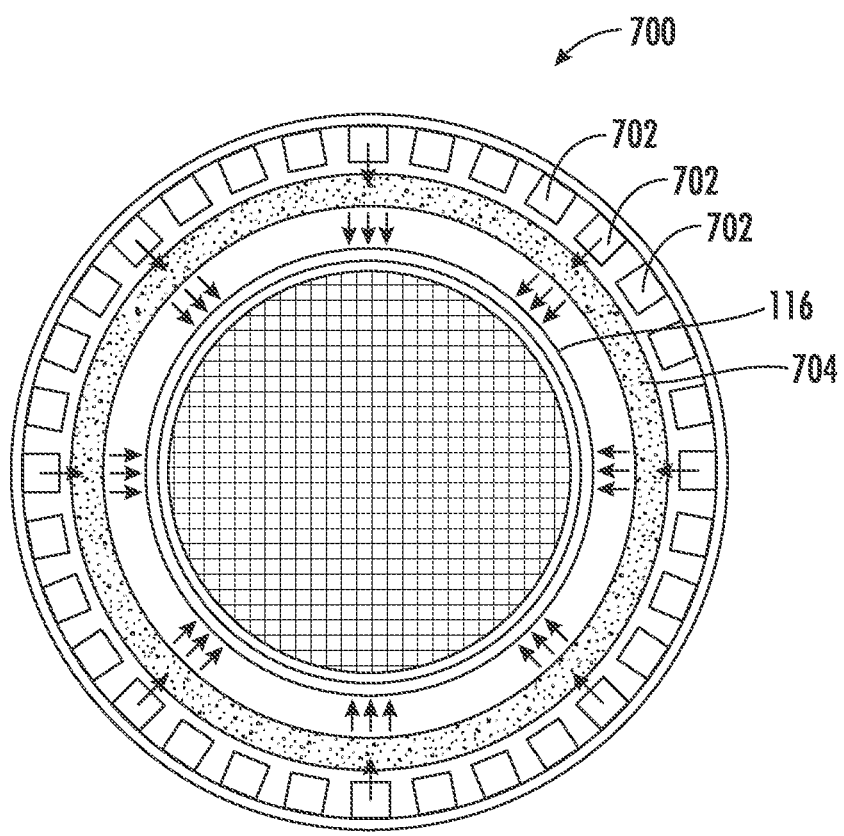
FIG. 7 is a front view of an infrared emitting device suitable for use in the extrusion systems of FIGS. 1 and 6 according to one embodiment, with the infrared emitting device including a plurality of circumferentially distributed infrared emitters and a diffuser arranged between the emitters and a wet extrudate material.

FIG. 7 is a front view of another embodiment of an infrared emitting device 700 for use in the extrusion systems 100, 600 of FIGS. 1 and 6. The infrared emitting device 700 includes a plurality of circumferentially positioned emitters 702 (e.g., infrared emitting light emitting diodes or lasers in certain embodiments) and a diffuser 704 concentrically positioned relative to the plurality of circumferentially positioned emitters 702. The diffuser 704 diffuses or scatters radiation of the circumferentially positioned emitters 702 to increase uniformity of irradiation of the wet extrudate material 114 to form the stiffened wet extrudate material 116. The number and spacing of the circumferentially positioned emitters 702 may depend on the type of emitter 702, the type of diffuser 704, and the irradiation uniformity required for a particular application. In such a configuration, the plurality of circumferentially positioned emitters 702 may include a plurality of different types of emitters to produce a plurality of infrared emissions of differing peak emission wavelengths, differing full-width, half-maximum emission wavelength ranges, and/or differing total radiant flux.

Figure 8:
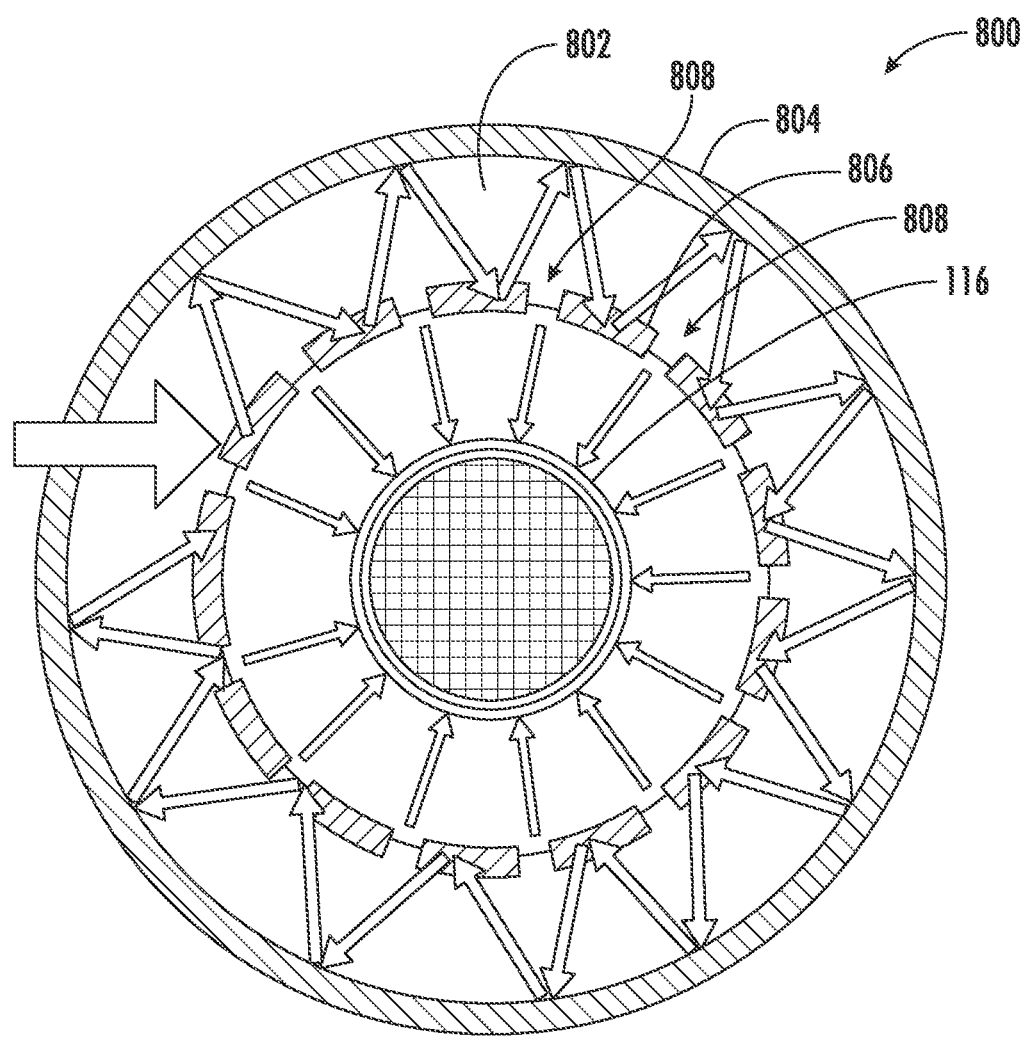
FIG. 8 is a front view of an infrared emitting device for diffusing an infrared laser beam and suitable for use in the extrusion systems of FIGS. 1 and 6 according to one embodiment.

FIG. 8 is a front view of a laser emitting device 800 for use in the extrusion systems 100, 600 of FIGS. 1 and 6. The laser emitting device 800 could be used for the delivery of $CO_2$ lasers, NIR lasers, etc. The laser emitting device 800 includes a glass body 802, an outer tubular-shaped reflector 804, and an inner tubular-shaped reflector 806 for uniformly distribution laser radiation onto the wet extrudate material 114. The inner tubular-shaped reflector 806 has a coating profile which leaks laser radiation to the wet extrudate material 114. For example, in certain embodiments the outer tubular-shaped reflector 804 includes a continuous coating on the glass body 802 to reflect all radiation (e.g., light), and the inner tubular-shaped reflector 806 includes a discontinuous coating (e.g., with a plurality of circumferentially placed gaps 808) on the glass body 802, such that a small amount of radiation (e.g., light) is transmitted toward the center. In this way, as the radiation (e.g., light) bounces throughout the glass body 802, small amounts of radiation continuously leaks out, thereby achieving uniform heating of the wet extrudate material 114 to form the stiffened wet extrudate material 116. Alternatively, in certain embodiments, a light diffusing fiber, such as Corning Fibrance® fiber, may be used to scatter laser light uniformly around the wet extrudate material 114 to achieve uniform heating.

In certain embodiments, a ring-shaped resistive heater may be used. By varying the current of the heater, the emission peak wavelength can be tuned to maximize heating efficiency. According to Wien's displacement law, the peak emission wavelength is given by $\lambda=b/T$, where 'b' is Wien's constant, and 'T' is the absolute temperature in Kelvin. Changing current into the heater will result in changes in heater power and thus shift the max emission wavelength. The resistive heating elements can be made, for example, of silicon carbide (SiC), iron-chromium-aluminum (FeCrAl) wire (e.g., Kanthal® resistance wire commercially available from Sandvik AB, Hallstahammar, Sweden), or other materials known in the art. Heater designs may be based on extrusion speed, skin thickness, diameter of the wet extrudate material, etc. Heating power can be increased by increasing the size of the heating element (surface emission area), and uniform heating on the extrudate exterior can be achieved using a coiled filament design or other configurations known in the art.

The lower the temperature of the filament (resistance heating filament), the longer the wavelength and the lower the blackbody radiation intensity. This will then require a longer heating zone for equivalent radiation drying of the wet extrudate material exiting the extrusion die. As an example, assuming equal filament coverage, a halogen infrared source might be 0.01 the length of an MI (mineral insulated) heater source due to fourth power blackbody radiation. Other types of heaters that could be used are disclosed herein. Alternatively, the size (surface area) of the heating element may be increased to increase heating power.

Figure 9:
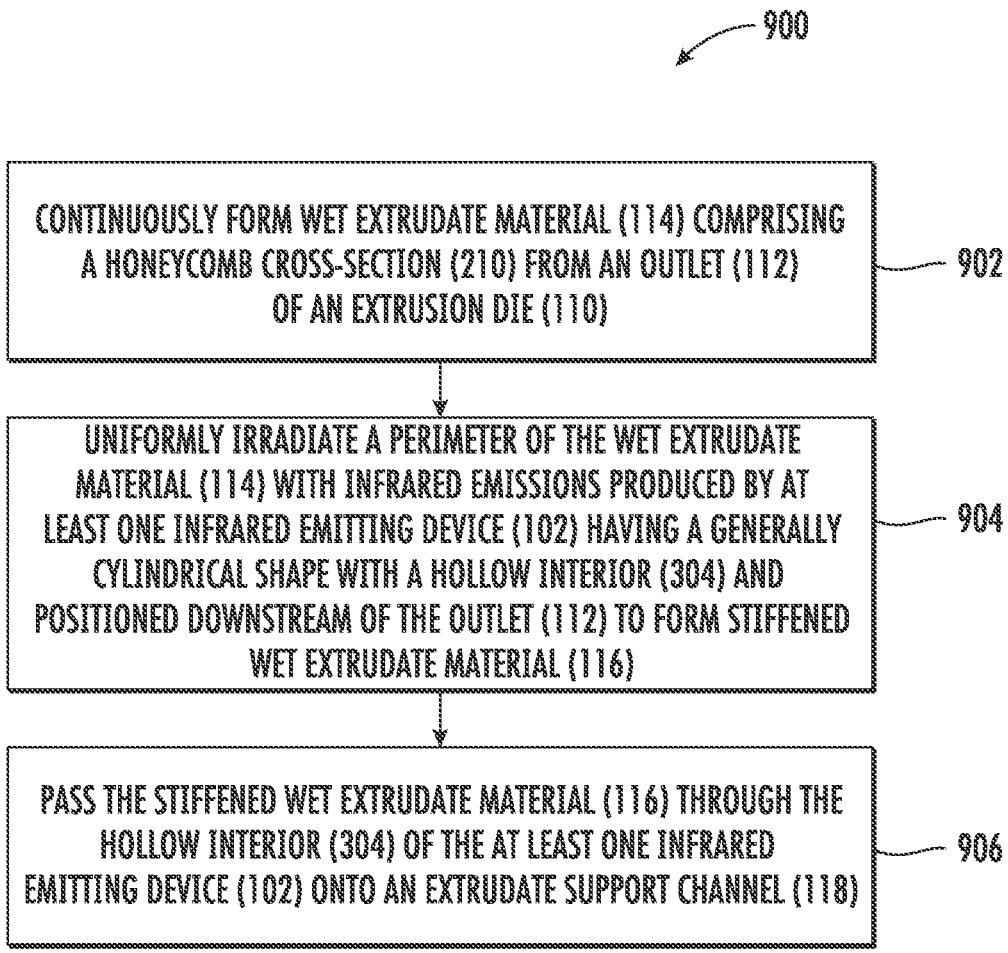
FIG. 9 is a flowchart identifying steps of a method for fabricating a stiffened wet extrudate material.

FIG. 9 is a flowchart 900 identifying steps of a method of fabricating a stiffened wet extrudate material 116. According to step 902, wet extrudate material 114 including a honeycomb cross-section 210 is continuously formed from an outlet 112 of an extrusion die 110. According to step 904, a perimeter of the wet extrudate material 114 is uniformly irradiated with infrared emissions produced by at least one infrared emitting device 102 having a generally cylindrical shape with a hollow interior 304 and positioned downstream of the outlet 112 to form stiffened wet extrudate material 116. In certain embodiments, the at least one infrared emitting device 102 comprises a plurality of infrared emitting devices 102A-102C including a first infrared emitting device 102A and a second infrared emitting device 102B positioned downstream of the first infrared emitting device 102A in a direction of travel of the wet extrudate material 114. The wet extrudate material 114 is irradiated with a first radiant flux using the first infrared emitting device 102A and irradiated with a second radiant flux using the second infrared emitting device 102B. The second radiant flux differs from the first radiant flux. According to step 906, the stiffened wet extrudate material 116 is passed through the hollow interior 304 of the at least one infrared emitting device 102 onto an extrudate support channel 118.

It will be apparent to those skilled in the art that various modifications and variations can be made without departing from the spirit or scope of the invention.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. An extrusion system comprising:
   an extrusion die comprising an outlet and configured to continuously form wet extrudate material comprising a honeycomb cross-section;
   at least one infrared emitting device having a hollow interior, positioned downstream of the outlet in a direction of travel of the wet extrudate material, arranged in a generally cylindrical shape around a perimeter of the wet extrudate material, and configured to uniformly irradiate the perimeter of the wet extrudate material, without any portion of the wet extrudate material being supported from below within the hollow interior, to form stiffened wet extrudate material; and
   an extrudate support channel, positioned downstream of the at least one infrared emitting device and configured to receive the stiffened wet extrudate material following passage of the wet extrudate material through the hollow interior of the at least one infrared emitting device.

2. The extrusion system of claim 1 wherein:
   the at least one infrared emitting device is configured to produce infrared emissions having at least one peak emission wavelength and at least one full-width, half-maximum emission wavelength range;
   the wet extrudate material comprises a plurality of constituents each having an absorption spectrum having at least one peak absorption wavelength and at least one full-width, half-maximum absorption wavelength range; and
   the at least one full-width, half-maximum emission wavelength range comprises at least one wavelength value within 1 micrometer of a wavelength of the at least one full-width, half-maximum absorption wavelength range of the absorption spectrum of at least one constituent of the plurality of constituents.

3. The extrusion system of claim 2 wherein the at least one peak emission wavelength comprises at least one of 1.2 μm or 2.9 μm.

4. The extrusion system of claim 2 wherein the at least one peak absorption wavelength comprises at least one of 3 μm, 6 μm, or 10 μm.

5. The extrusion system of claim 1 wherein the generally cylindrical shape of the at least one infrared emitting device comprises an internal diameter of at least 100 mm.

6. The extrusion system of claim 1 wherein the at least one infrared emitting device comprises at least one laser.

7. The extrusion system of claim 1 wherein the at least one infrared emitting device comprises at least one lamp.

8. The extrusion system of claim 1 wherein the at least one infrared emitting device comprises a plurality of infrared emitting devices, and each infrared emitting device of the plurality of infrared emitting devices is configured to produce infrared emissions of a different peak emission wavelength and a different full-width, half-maximum emission wavelength range.

9. The extrusion system of claim 1 wherein the at least one infrared emitting device comprises a plurality of infrared emitting devices including a first infrared emitting device and a second infrared emitting device positioned downstream of the first infrared emitting device in the direction of travel of the wet extrudate material.

10. The extrusion system of claim 9 wherein the first infrared emitting device and the second infrared emitting device are each arranged in the generally cylindrical shape, and the first and second infrared emitting devices are configured to irradiate the wet extrudate material with differing total radiant flux.

11. A method of forming a stiffened wet extrudate material, the method comprising:
    continuously forming wet extrudate material comprising a honeycomb cross-section from an outlet of an extrusion die;
    uniformly irradiating a perimeter of the wet extrudate material with infrared emissions produced by at least one infrared emitting device having a generally cylindrical shape with a hollow interior and positioned downstream of the outlet, without any portion of the wet extrudate material being supported from below within the hollow interior, to form stiffened wet extrudate material; and
    passing the stiffened wet extrudate material through the hollow interior of the at least one infrared emitting device onto an extrudate support channel positioned downstream of the at least one infrared emitting device.

12. The method of claim 11 wherein:
    the infrared emissions comprise at least one peak emission wavelength and at least one full-width, half-maximum emission wavelength range corresponding to the at least one peak emission wavelength;
    the wet extrudate material comprises a plurality of constituents each having an absorption spectrum having at least one peak absorption wavelength and at least one full width, half-maximum absorption wavelength range corresponding to the at least one peak absorption wavelength; and
    the at least one full-width, half-maximum emission wavelength range corresponding to the at least one peak emission wavelength comprises at least one wavelength value within 1 micrometer of a wavelength of the at least one full-width, half-maximum absorption wavelength range corresponding to the at least one peak absorption wavelength of the absorption spectrum of at least one constituent of the plurality of constituents.

13. The method of claim 12 wherein the at least one peak emission wavelength comprises at least one of 1.2 μm or 2.9 μm.

14. The method of claim 12 wherein the at least one peak absorption wavelength comprises at least one of 3 μm, 6 μm, or 10 μm.

15. The method of claim 11 wherein the generally cylindrical shape of the at least one infrared emitting device comprises an internal diameter of at least 100 mm.

16. The method of claim 11 wherein the at least one infrared emitting device comprises at least one laser.

17. The method of claim 11 wherein the at least one infrared emitting device comprises at least one lamp.

18. The method of claim 11 wherein the at least one infrared emitting device comprises a plurality of infrared emitting devices, and each infrared emitting device of the plurality of infrared emitting devices is configured to produce infrared emissions of a different peak emission wavelength and a different full-width, half-maximum emission wavelength range.

19. The method of claim 11 wherein the at least one infrared emitting device comprises a plurality of infrared emitting devices including a first infrared emitting device and a second infrared emitting device positioned downstream of the first infrared emitting device in a direction of travel of the wet extrudate material, and the method further comprises irradiating the wet extrudate material with a first radiant flux using the first infrared emitting device and irradiating the wet extrudate material with a second radiant flux using the second infrared emitting device, and the second radiant flux differs from the first radiant flux.

20. The method of claim 11 wherein uniformly irradiating the perimeter of the wet extrudate material further comprises uniformly irradiating with an intensity and duration selected to provide the stiffened wet extrudate material with a uniformly stiffened external surface and a non-stiffened core.

\* \* \* \* \*